(12) United States Patent
Zhou et al.

(10) Patent No.: US 8,842,915 B2
(45) Date of Patent: Sep. 23, 2014

(54) CONNECTIVITY SIMILARITY BASED GRAPH LEARNING FOR INTERACTIVE MULTI-LABEL IMAGE SEGMENTATION

(75) Inventors: Bingfeng Zhou, Beijing (CN); Yadong Mu, Beijing (CN)

(73) Assignee: Peking University, Beijing (CN)

( * ) Notice: Subject to any disclaimer, the term of this patent is extended or adjusted under 35 U.S.C. 154(b) by 208 days.

(21) Appl. No.: 13/260,109

(22) PCT Filed: Apr. 22, 2009

(86) PCT No.: PCT/CN2009/071402
§ 371 (c)(1),
(2), (4) Date: Sep. 23, 2011

(87) PCT Pub. No.: WO2010/121422
PCT Pub. Date: Oct. 28, 2010

(65) Prior Publication Data
US 2012/0027300 A1 Feb. 2, 2012

(51) Int. Cl.
*G06K 9/34* (2006.01)

(52) U.S. Cl.
USPC ......................................................... 382/173

(58) Field of Classification Search
None
See application file for complete search history.

(56) References Cited

U.S. PATENT DOCUMENTS

| | | | | |
|---|---|---|---|---|
| 7,536,064 B2 * | 5/2009 | Venkatesan et al. | .......... | 382/305 |
| 7,995,810 B2 * | 8/2011 | Li et al. | .......... | 382/128 |
| 8,332,333 B2 * | 12/2012 | Agarwal | .......... | 706/12 |
| 2003/0030638 A1 | 2/2003 | Andreasson et al. | | |
| 2004/0267686 A1 * | 12/2004 | Chayes et al. | .......... | 707/1 |
| 2005/0163375 A1 * | 7/2005 | Grady | .......... | 382/180 |
| 2006/0104513 A1 * | 5/2006 | Aharon et al. | .......... | 382/180 |
| 2006/0214932 A1 * | 9/2006 | Grady et al. | .......... | 345/440 |
| 2007/0025616 A1 * | 2/2007 | Grady et al. | .......... | 382/173 |
| 2007/0032986 A1 * | 2/2007 | Hines et al. | .......... | 702/183 |
| 2007/0058865 A1 * | 3/2007 | Li et al. | .......... | 382/173 |
| 2007/0165949 A1 * | 7/2007 | Sinop et al. | .......... | 382/173 |
| 2008/0004517 A1 * | 1/2008 | Bhandarkar et al. | .......... | 600/407 |
| 2008/0030497 A1 * | 2/2008 | Hu et al. | .......... | 345/419 |
| 2008/0071843 A1 * | 3/2008 | Papadimitriou et al. | .......... | 707/204 |
| 2008/0100621 A1 * | 5/2008 | Aharon et al. | .......... | 345/424 |
| 2008/0260247 A1 * | 10/2008 | Grady et al. | .......... | 382/173 |
| 2008/0304743 A1 * | 12/2008 | Tang et al. | .......... | 382/173 |
| 2008/0317308 A1 * | 12/2008 | Wu et al. | .......... | 382/128 |
| 2009/0136103 A1 * | 5/2009 | Sonka et al. | .......... | 382/128 |
| 2010/0104186 A1 * | 4/2010 | Grady et al. | .......... | 382/173 |
| 2010/0111417 A1 * | 5/2010 | Ward et al. | .......... | 382/173 |
| 2010/0266175 A1 * | 10/2010 | Seung et al. | .......... | 382/128 |
| 2011/0314367 A1 * | 12/2011 | Chang et al. | .......... | 715/230 |

FOREIGN PATENT DOCUMENTS

CN 101271525 A 9/2008

OTHER PUBLICATIONS

"Label Propagation Through Linear Neighborhoods," Wang, Fei et al, Proceedings of the 23rd International Conference on Machine Learning, Pittsburgh, PA, 2006, 8 pages.*

(Continued)

*Primary Examiner* — Wenpeng Chen
(74) *Attorney, Agent, or Firm* — Maschoff Brennan

(57) ABSTRACT

A system and method of connectivity-based image processing to identify and extract objects in image data is described. Variations on the method may include iterative local smoothing operations and various algorithmic solutions to improve real-time processing. Variations may also include object extraction processes based on user-provided information about an object in an image.

10 Claims, 8 Drawing Sheets

(56) References Cited

OTHER PUBLICATIONS

Boykov, Y.Y, and Jolly, M-P., "Interactive Graph Cuts for Optimal Boundary & Region segmentation of Objects in N-D Images," Proceedings of International Conference on Computer Vision, vol. I, pp. 105-112 (2001).

Chang, H., and Yeung, D-Y, "Robust Path-Based Spectral Clustering With Application to Image Segmentation," Tenth IEEE International Conference on Computer Vision, vol. 1, pp. 278-285 (2005).

Chang, H., and Yeung, D-Y., "Graph Laplacian Kernels for Object Classification From a Single Example," IEEE Computer Society Conference on Computer Vision and Pattern Recognition, vol. 2, pp. 2011-2016 (2006).

Chang, H., and Yeung, D-Y., "Robust Path-Based Spectral Clustering," Pattern Recognition, vol. 41, No. 1, pp. 191-203 (2007).

Fischer, B., et al., "Clustering with the Connectivity Kernel," NIPS, pp. 8 (2003).

Li, Y., et al., "Lazy snapping," ACM Transaction on Graphics, vol. 23, Issue. 3, pp. 303-308 (2004).

Mu Y., and Zhou, B., "Co-segmentation of Image Pairs with Quadratic Global Constraint in MRFs," Asian Conference on Computer Vision, vol. 2, pp. 837-846 (2007).

Mu, Y., and Zhou, B., "Connectivity Similarity Based Transductive Learning for Interactive Image Segmentation," IEEE International Conference on Acoustics, Speech and Signal Processing, pp. 1233-1236 (2009).

Nagahashi, T., et al., "Iterated Graph Cuts by Multi-level Smoothing for Image Segmentation," MIRU, pp. 241-248 (2007) (English Abstract).

Rother, C., "Cosegmentation of Image Pairs by Histoxgram Matching—Incorporating a Global Constraint into MRFs," IEEE Computer Society Conference on Computer Vision and Pattern Recognition, vol. 1, pp. 993-1000 (2006).

Rother, C., et al., ""Grabcut"—Interactive Foreground Extraction using Iterated Graph Cuts," ACM Transaction Graphic, vol. 23, Issue 3, pp. 309-314 (2004).

Sun, J., "Flash Cut: Foreground Extraction with Flash and No-flash Image Pairs," IEEE Conference on Computer Vision and Pattern Recognition, pp. 1-8 (2007).

Wang, F., and Zhang, C., "Label Propagation Through Linear Neighborhoods," IEEE Transactions on Knowledge and Data Engineering, vol. 20, Issue 1, pp. 55-67 (2008).

Wang, F., et al., "Semi-Supervised Classification Using Linear Neighborhood Propagation," IEEE Computer Society Conference on Computer Vision and Pattern Recognition, vol. 1, pp. 160-167 (2006).

Yu, S.X., and Shi, J., "Multiclass spectral clustering," Proceedings Ninth IEEE International Conference on Computer Vision, vol. 1, pp. 313-319 (2003).

Zhou, D., "Learning with local and global consistency," NIPS, pp. 8 (2003).

International Search Report for International Application No. PCT/CN2009/071402 mailed on Feb. 4, 2010, pp. 3.

* cited by examiner

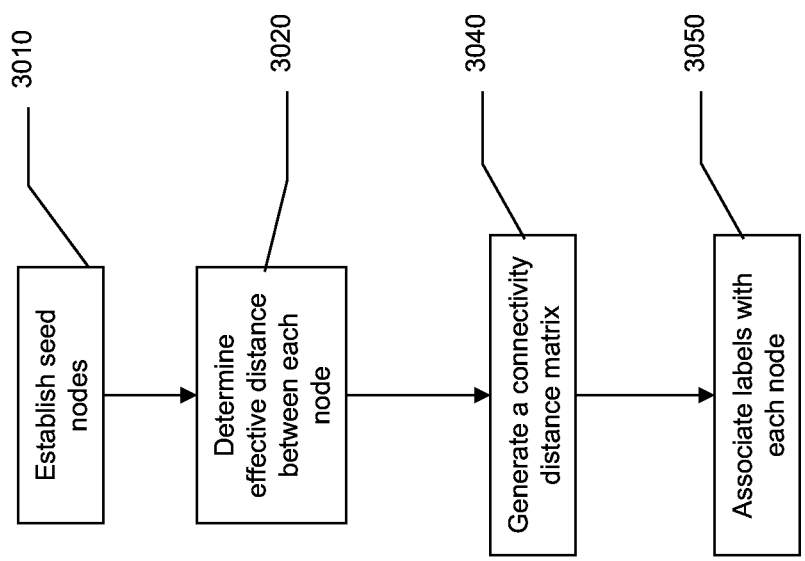

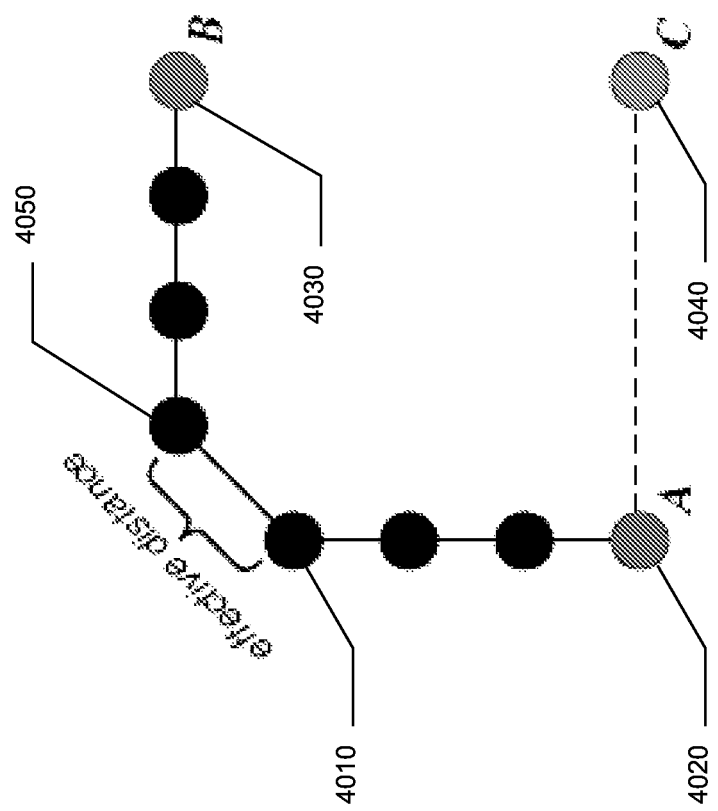

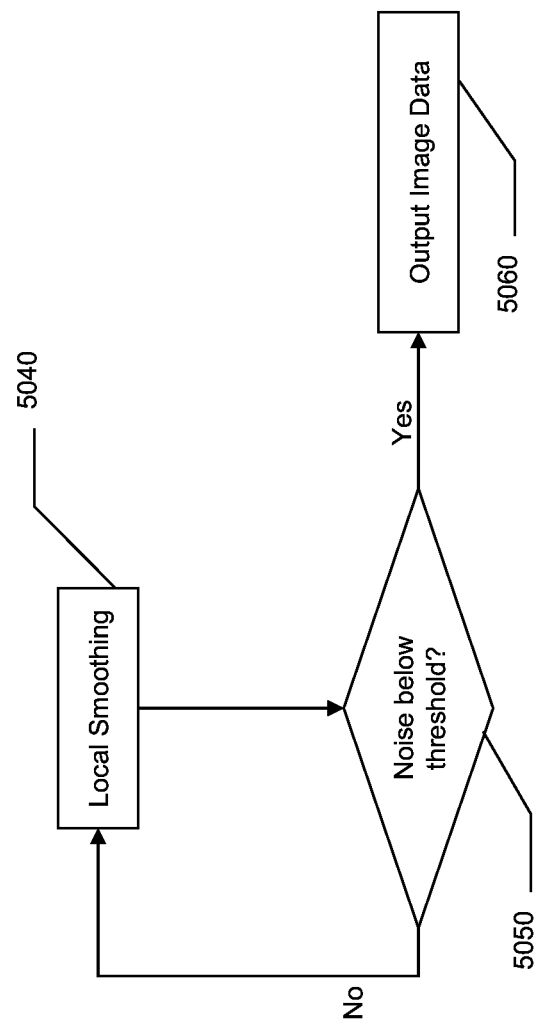

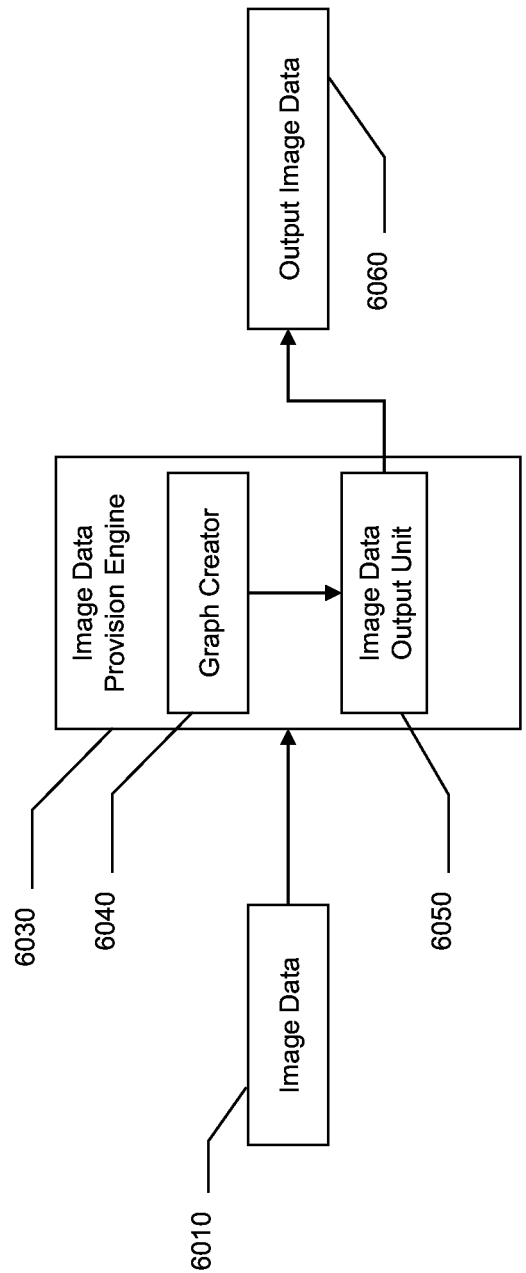

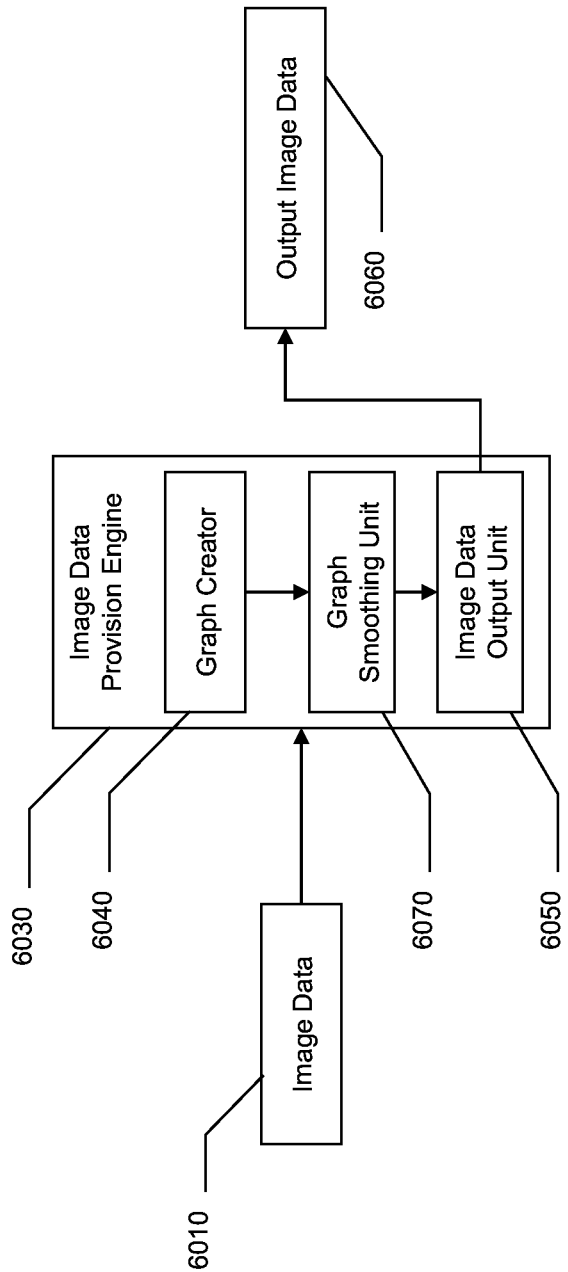

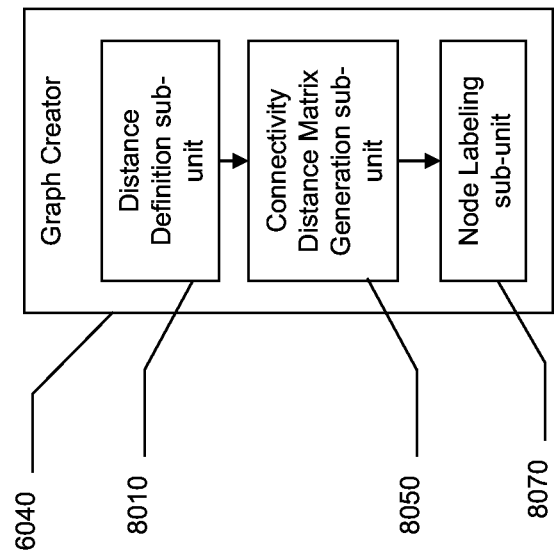

CONNECTIVITY SIMILARITY BASED GRAPH LEARNING FOR INTERACTIVE MULTI-LABEL IMAGE SEGMENTATION

BACKGROUND

Image segmentation is one of the traditional and important problems in computer vision and image processing. Its potential applications are especially wide, such as medical image analysis and personal photo editing. Fully automated image segmentation is possible yet prone to error, mainly because it is difficult to overcome the gap between local image features (e.g. colors, edges, textures, local histograms) and high-level semantics. Instead, in recent years semi-automated or user-aided image segmentation has attracted increasing interest due to its low requirement and higher accuracy.

There are two general approaches to interactive image segmentation: inductive and transductive. The two approaches differ mainly in how they utilize user guidance. In most inductive approaches, images are assumed to be drawn from certain statistical models whose parameters can be obtained via maximum likelihood or MAP (i.e. maximum a priori) estimation from seed values provided by a user.

Transductive graph-based methods avoid implicit feature modeling via non-parametric label propagation. Typically images are modeled as sparse graphs with 2D lattice topology. Individual pixels or overlapped small patches are treated as graph nodes, while adjacent pixels are connected by an edge in the constructed graph. The graph nodes that correspond to user-provided "seed" pixels or patches are ones that may be regarded as having a high confidence about their labels, and this information is iteratively propagated to remote unlabeled nodes along weighted graph edges.

Transductive, graph-based segmentation has some deficiencies in the areas of graph construction and graph propagation. Current graph construction approaches are based on local comparisons such as L2 distance in RGB color space, which drops all global information. Due to the strength decaying effect for local propagation, estimations for remote nodes far away from user-specified seeds tend to be erroneous.

SUMMARY

Features consistent with some embodiments of solutions to the above-discussed shortcomings of transductive segmentation may include a method of providing image data. Such a method may include identifying information associated with an object in an image and constructing a graph based on the identified information associated with the object in the image. Some embodiments of graph construction may include the receipt, input, generation or selection of the identified information as part of the identifying information process. Yet further embodiments may include the identified information as part of the image data. Further embodiments still may include information on seed nodes or seed pixels in the identified information.

A graph created by an embodiment of a graph construction approach as described herein may include connectivity similarity, which is a global, pair-wise similarity definition, for a plurality of nodes in the graph. Yet further embodiments may have connectivity similarity for all graph nodes.

After being constructed, local smoothing may be performed between spatially close graph nodes. After smoothing, the image data representing the identified object may be provided based on the smoothed graph that results from the local smoothing operation. Embodiments of such a method may employ computationally efficient (i.e. polynomial time) algorithms, such as variations of minimum spanning tree algorithms, to realize faster computing performance in real-time.

Part of a graph construction process in an embodiment of the above method may include defining effective distances for valid paths between two graph nodes and taking, as the inter-nodal distance between the two graph nodes, the minimum value of the effective distances. This is a form of global, pair-wise similarity as it allows physically distant nodes to be associated with small effective distances and therefore high degrees of similarity.

Another part of a graph construction process in an embodiment of the above method may involve labeling a graph node with a number of labels corresponding to the number of nodes the graph node connects to. In such a labeling approach, a label is associated with a connectivity distance between the graph node and a connected node. Combined with the above-discussed effective distance definition, an embodiment of this labeling approach may use the inter-nodal distance as the connectivity distance for a label. Certain embodiments of labeling approaches may also allow for a graph node to have more than two labels.

An embodiment of a graph construction process may also include the creation of a connectivity distance matrix that has at least one column vector corresponding to a graph node's confidence for a specific label. Such a column vector (or vectors) may contain some noise, which may be represented by one or more values in the vector that are statistical outliers. A local smoothing approach performed between spatially close graph nodes may mitigate or reduce the level of noise by removing statistical outliers. One possibility for local smoothing includes an iterative linear neighborhood propagation algorithm. One embodiment of such an algorithm identifies and removes outliers from the column vectors based on the mean confidence values of neighboring nodes. Another possibility includes an approach that performs noise detection before or after a smoothing iteration to determine if further smoothing may be necessary. Such an embodiment may also include a specific noise threshold level in the noise detection process.

Embodiments of a graph construction process may be initiated with the identification, determination, analysis, or computation of seed values, or seed nodes. Such values may be derived from the identified information associated with the object, or they may be the identified information itself. The identified information may be received as part of an input to an embodiment of a graph construction process as described above, or it may be automatically or interactively generated as an initial portion of graph construction, or in a broader application that employs an embodiment of a graph construction process described herein.

Embodiments of the above-discussed method and related approaches may be performed by a computing device executing software stored locally, contained on a removable storage medium, or transmitted to the computer as a modulated signal. Yet further embodiments may be realized through the use of more specialized devices, such as an image data provision device that provides image data associated an object from an image.

An embodiment of the above image data provision device may contain an identification unit that identifies information associated with an object in an image, and a graph creator that constructs a graph based on the identified information associated with the object in the image. An embodiment of a graph so constructed may include connectivity similarity for a plurality of nodes in the graph. Yet further embodiments may allow for connectivity similarity for all graph nodes.

An embodiment of the device may also include a graph smoothing unit that performs local smoothing between spatially close graph nodes. After smoothing, the graph data may be passed to an image data output unit that provides, as output, image data representing the object based on the smoothed graph produced by the graph smoothing unit. As in the above-discussed method, the graph creator may employ a computationally efficient graph creation algorithm.

The graph creator may include a distance definition sub-unit that, defines effective distances for valid paths between two nodes, and sets, as the inter-nodal distance between the two graph nodes, the minimum value of the effective distances.

The graph creator may also include a node labeling sub-unit that labels a graph node with a number of labels corresponding to the number of nodes the graph node connects to and that associates a label with a connectivity distance between the graph node and a connected node. Further embodiments of a graph creator may also include a connectivity distance matrix generation sub-unit that generates a connectivity distance matrix having at least one column vector that corresponds to a graph node's confidence for a specific label.

Such a column vector (or vectors) may contain some noise, which may be represented by one or more values in the vector that are statistical outliers. A local smoothing approach performed between spatially close graph nodes may mitigate or reduce the level of noise by removing statistical outliers. Embodiments of an image data provision device may therefore include a graph smoothing unit that performs local smoothing between spatially close graph nodes with an iterative linear neighborhood propagation algorithm. One embodiment of such an algorithm identifies and removes outliers from the column vectors based on the mean confidence values of neighboring nodes. Another possibility includes an approach that performs noise detection before or after a smoothing iteration to determine if further smoothing may be necessary. Embodiments of the graph smoothing unit may include a specified noise threshold level in the noise detection process.

Embodiments of an image data provision device as discussed herein may, in the graph creator, initiate a graph construction process with the identification, determination, analysis, or computation of seed values, or seed nodes. Such values may be derived from the identified information associated with the object, or the values may be the identified information itself. The identified information may be received as part of an input to an embodiment of an image data provision device as described above, or it may be automatically or interactively generated as an initial portion of graph construction, or in a broader device that employs an embodiment of an image provision device described herein. The identification unit may also include a selection sub-unit that allows for selection of at least part of an object within an image. The selected at least part of an object, or information associated with the selected part, may comprise at least a portion of the identified information.

Embodiments of graphs may be represented, at least in part, by a connectivity distance matrix having at least one column vector that corresponds to a graph node's confidence for a specific label. In such a matrix, a graph node may be associated with a number of labels corresponding to the number of nodes said graph node connects to (some nodes, in some embodiments, may have more than two labels).

In some graph embodiments, ea label associated with a graph node is associated with an effective distance between the graph node and a node connected to it. In some embodiments, the effective distance between two nodes is the inter-nodal distance between the nodes. Embodiments of graphs may also have connectivity similarity for a plurality of nodes, and their nodes may be locally smoothed with an iterative linear neighborhood propagation algorithm. Yet further embodiments may have connectivity similarity for all nodes.

Embodiments of graphs may be stored as data on computer readable media or transmitted as modulated signals during, before, or as partial outcomes of embodiments of image data provision operations described herein.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings:

FIG. 3 shows a block diagram of an embodiment of a graph creation process;

FIG. 4 shows an embodiment of an effective distance determination on a graph;

FIG. 5 shows a block diagram of an embodiment of an iterative local smoothing operation;

FIG. 6 shows a block diagram of an embodiment of an image data provision device;

FIG. 7 shows a block diagram of an embodiment of an image data provision device with a smoothing unit; and FIG. 8 shows a block diagram of an embodiment of a graph creator with distance definition, node labeling, and connectivity distance matrix generation sub-units.

Figure 1:
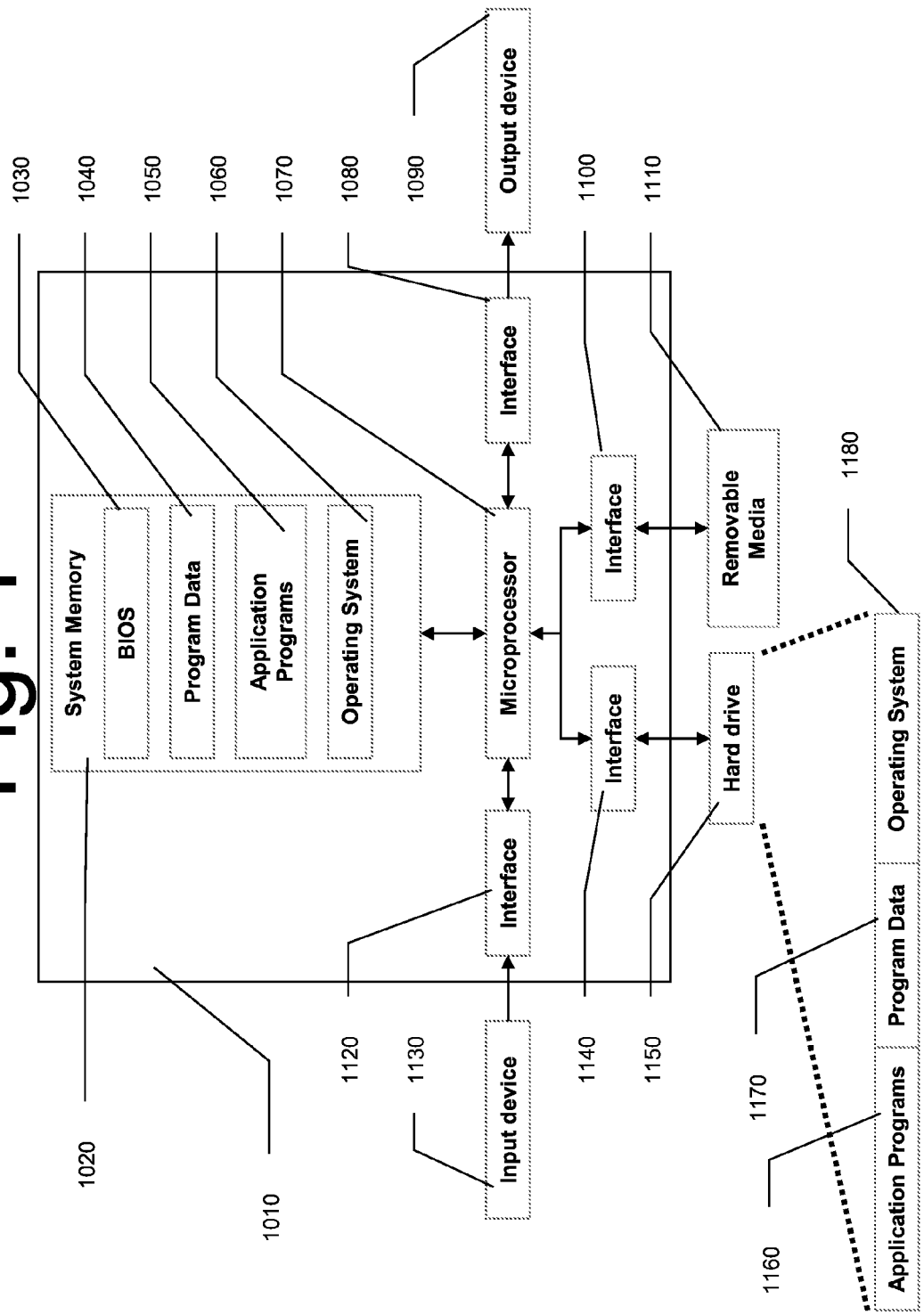
FIG. 1 depicts a system capable of executing a program that causes the computer to perform an embodiment of the image data provision approach described herein.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, computer readable mediums storing the computer program and systems related to image processing.

FIG. 1 shows a general purpose computing device that may carry out an embodiment of the image data provision method discussed herein. The computer includes main processing area 1010 as well as input 1130 and output 1090 devices, internal storage 1150 and removable storage media 1110. The input and output devices 1130, 1090 and internal and removable storage 1150, 1110 each have an associated interface 1120, 1080, 1140, 1100, respectively, which connects them to a microprocessor 1070. The microprocessor 1070 may access system memory 1020, which includes a built-in operating system (BIOS) 1030, an operating system 1060, application programs 1050 (which may include a program that carries out an embodiment of the image data provision method disclosed) and program data 1040 (which may include image data to be processed). The operating system 1180, program data 1170, and application programs 1160 may also be stored in the computer's internal storage 1150 or on the removable storage 1110 (either together or separately) for later retrieval and use or may be received by an input device 1130 as information encoded in one or more modulated signals.

Figure 2:
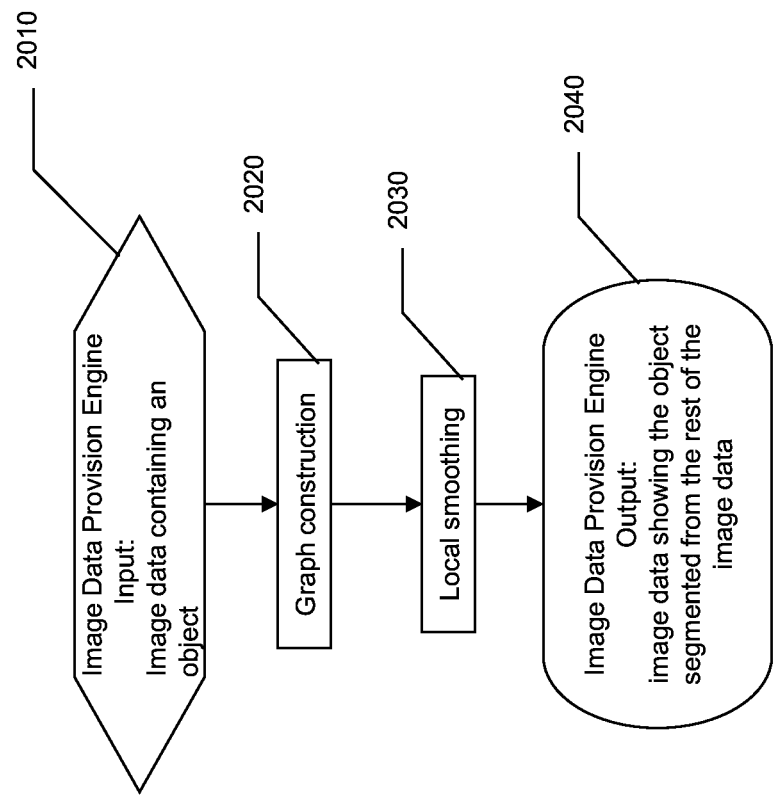
FIG. 2 shows a high-level flowchart of an embodiment of the image data provision approach described herein.

An embodiment of the image data provision method may take the form of an image data provision engine, as shown in the high-level flow diagram in FIG. 2. Such an engine may take, as input 2010, image data containing at least one object. The engine constructs a graph of the image 2020, performs local smoothing of the graph 2030, and then identifies and provides image data showing the objects 2040 based on the smoothed graph.

Alternative embodiments of an image data provision engine may also accept as input information about an object in the image. Such information may be provided within the image data 2010, or submitted as separate input data or metadata. In some other alternative embodiments, such information may include user-provided data points showing one or more approximate locations on the image that correspond to the object within the image. Such data points may be used to develop or locate seed values for graph construction 2020. In yet further embodiments, the information about an object within the image may include a set of seed values ready for immediate use and processing in graph construction 2020.

Graph Construction

In an embodiment of a graph generation approach according to an embodiment of the image data provision method disclosed, $X=\{x_i | i$ belongs to $I\}$ may denote the image array, where I is the index set. Also, in this embodiment, the relationships between the overall index set and the index sets for labeled and unlabeled nodes may be represented as $I=I_L \cup I_U$ and $I_L \cap I_U = 0$ where $I_L$, $I_U$ are index sets for labeled or unlabeled nodes. A graph constructed in this embodiment of graph generation may be denoted as $G=<V; E>$ where V, E represent sets of graph nodes and edges respectively.

An embodiment of a graph generation approach is depicted in FIG. 3. In the approach shown, seed nodes are established 3010 as an initial step. In embodiments of graph generation, the seed nodes may be established through external selection of particular points on the image. One such embodiment of this type may permit a user to select points on the image associated with the boundaries of an object therein. Seed node establishment may be omitted in embodiments of graph generation where information about particular seed pixels is embedded in or otherwise included with the image data. Yet further embodiments may supply information about seed nodes to a graph creation process as part of the overall input data.

In the embodiment depicted, once seed nodes are identified, graph generation continues with a determination of effective distances between the nodes 3020 and generation of a connectivity distance matrix 3040. After a connectivity matrix is generated, labels are associated with each node 3050. Various embodiments of these steps are discussed below.

A simple approach to graph generation may be to treat each pixel as a single node, and define graph edges over an 8-connected neighborhood.

The edge weights in G may be measured either using distance $d_{ij}$ for node i, j or local similarity $s_{ij}$. These two measurements may produce similar results in many cases. One method of calculating distance and/or similarity for edge weights is based on a distance between two nodes represented as the square of the normed difference between the node values. The impact of seeds decays drastically when spatial distance becomes large.

A different edge weight measurement approach may provide improved results for a situation with few seed values and many remote nodes far from the seeds. A distance metric defined as being based on both local (inter-nodal) distance and global data distribution may be able to overcome the above-mentioned issue of decaying seed impact.

In the graph creation embodiment shown, effective distance between each node is determined 3020 using connectivity similarity. An underlying concept in connectivity similarity is the transformation of elongated structures to compact ones. As can be seen in FIG. 4, unknown node A 4020 is more similar to source node B 4030 rather than C 4040. However there is a long path connecting A and B through several intervening nodes, i.e. A, B may lie on an elongated manifold. Taking the collections of paths from node i to j as $P_{ij}$, the effective distance for each valid path p belonging to $P_{ij}$ may be defined as the maximum step length between the nodes, and the inter-nodal distance between i, j is minimum value of all effective distances among all p, that is:

$$\hat{d}_{ij} = \min_{p \in P_{ij}} \left\{ \max_{1 \leq h \leq |p|-1} d_{p[h]p[h+1]} \right\}, \hat{s}_{ij} = \exp\left(-\frac{\hat{d}_{ij}}{2\sigma^2}\right)$$

In FIG. 4, the step length of each path between A 4020 and B 4030 is the distance between each pair of nodes on the manifold. The shortest inter-node distance is depicted here as being between a first 4010 and second 4050 adjacent node in the manifold. Taking this distance as the effective distance between A and B, nodes A and B may now be understood as being much more similar than visually indicated.

One issue about connectivity similarity is its computation complexity. Since the number of nodes in the image graph is typically on the order of $10^4$ or even higher, embodiments employing computationally efficient (i.e. polynomial-time)

algorithms with low degree are much more computationally suitable for real-time embodiments. Kruskal's minimum spanning tree algorithm is an example of such a computationally efficient algorithm, but other embodiments may use other algorithms having different levels of computational efficiency.

Referring back to FIG. 3, once effective distances between graph nodes are determined, a connectivity matrix may be generated 3040. Such a matrix may have column vectors arranged so that each vector is associated with a particular effective distance between two nodes. Embodiments of the graph and associated matrix may be non-directional, so that the effective distance between two nodes is the same from the perspective of either node.

Once a connectivity matrix is in place, the vectors of the matrix, which represent effective distances between nodes, may be associated with labels 3050. The set of labels applied to a graph may be denoted as $L=\{1, 2 \ldots L_{max}\}$ and a label $L_i$ that is in L may represent a label of node $x_i$. For nodes identified as un-labeled (all nodes that are not seed nodes may be un-labeled at the start label association), their labels may be initialized as 0 (i.e. unknown). For each i belonging to $I_L$, its connectivity distance to every unlabeled node in $I_U$ may be calculated using an embodiment of the effective distance determination 3020. Under such an approach each unlabeled node j, gets $L_{max}$ distance values in all, each for a unique label in L, which can be defined as:

$$d_j^l = \min_{i \in I_L, L_i = l} \hat{d}_{ij}, \text{ and } s_j^l = \max_{i \in I_L, L_i = l} \hat{s}_{ij}$$

Note that labels may be directional, so that a labeled node is associated with a particular perspective not shared by any other node in the graph. Each node may have a set of labels (with nodes being permitted to have more than two labels) where each label is associated with the effective distance between that node and a connecting node.

Local Smoothing Through Linear Propagation

Embodiments of graph generation may produce an $N*L_{max}$ connectivity distance matrix $\hat{D}$, where $\hat{D}(i,l) = d_i^l$. Each column vector of b may correspond to graph node's confidence for one specific label. However, the obtained distance values may be too noisy to directly perform graph node classification.

In MRF image modeling, a priori knowledge such as Ising prior may be incorporated for outlier removal and local averaging. MRF global optimization can be very time-consuming for multi-label cases, even guided by heuristics, and may not be well suited for real-time applications such as interactive segmentation. A local smoothing method called Linear Neighborhood Propagation (LNP) may be more suitable for real-time embodiments of image data provision operations discussed herein. In an embodiment of LNP smoothing, each graph node may iteratively improve its initial status by referring to the mean value of its neighbors. Given the propagation matrix W, an embodiment of an LNP local smoothing operation may operate as follows:

$$y^{t+1} = \alpha W y^t + (1-\alpha) \hat{D}$$

where $\alpha \in (0,1)$ is a free parameter and $Y^0 = \hat{D}$. In an embodiment where a sequence $\{Y^t\}$ converges to $Y^*$, the final label for node i may be determined via $L_i = \arg \min Y^*(i, l)$.

In different embodiments of an image data provision method, local smoothing may be iteratively performed multiple times. Because each local smoothing iteration may improve the confidence vector for a label by identifying an removing outlier values, each local smoothing iteration may also improve the average confidence values of the labels of nearby nodes. As the average confidence values (i.e. the vectors) become more noise-free, their impact on subsequent local smoothing cycles may also be improved.

For an embodiment having a number of nodes "n", an example of a cycle of an iterative local smoothing operation may be depicted as follows. Taking the i-th columns of Y and D as the vectors $Y^i = [y_1 \ y_2 \ \ldots \ y_n]^T$ and $D^i = [d_1 \ d_2 \ \ldots \ d_n]^T$, where the superscript T denotes a matrix transposition operation (the superscript i for each vector is omitted for ease of notation), the status of $Y^i$ at a point in time t may be depicted as $[y_1^t \ y_2^t \ \ldots \ y_n^t]$, and the status of $Y^i$ at a subsequent point in time t+1 may be depicted as $[y_1^{t+1} \ y_2^{t+1} \ \ldots \ y_n^{t+1}]$. A local smoothing formula updating the status of $Y^i$ at time t+1 may then be described as:

$$\begin{pmatrix} y_1^{t+1} \\ y_2^{t+1} \\ - \\ y_n^{t+1} \end{pmatrix} = \alpha \begin{pmatrix} w_{11} & w_{12} & \ldots & w_{1n} \\ w_{21} & w_{22} & \ldots & w_{2n} \\ - & & & - \\ w_{n1} & w_{n2} & \ldots & w_{nn} \end{pmatrix} \times \begin{pmatrix} y_1^t \\ y_2^t \\ - \\ y_n^t \end{pmatrix} + (1-\alpha) \begin{pmatrix} d_1 \\ d_2 \\ - \\ d_n \end{pmatrix}$$

Local smoothing may therefore be performed, in some embodiments, more than once. In certain embodiments, local smoothing operations may be iteratively performed up to twenty times or more depending on the noise level in the confidence vectors. Such an iterative smoothing embodiment may, as shown in FIG. 5, have a noise detection capability 5050 that analyzes the vectors after smoothing to determine if they are below an overall threshold noise level. If the noise level is deemed above a certain threshold, another local smoothing iteration 5040 may be performed.

One embodiment of thresholding or noise analysis may include measuring a resulting difference between two successive iterations of smoothing. If the difference is below a certain threshold, the graph may be deemed sufficiently smooth for further use. Alternative embodiments may simply employ a fixed number of iterations without monitoring noise levels, and yet other embodiments may employ a combined approach of fixed iteration blocks of five, ten, or more smoothing iterations with a resulting difference comparison performed on the final two iterations of each block to determine if further smoothing is required.

Embodiments of a local smoothing operation as discussed above may also employ computational techniques such as super-pixel processing for improved real-time performance on images with large numbers of pixels (i.e. very large and/or high-resolution images).

Once the confidence vectors are deemed to be in a usable state, image data corresponding to the object may be generated and output 5060 either for dispaly, storage, transmission, or further processing. Image data may be identified for output based on the label information. As the sequence $\{Y^t\}$ converges on a fixed point $Y^*$, a label for a pixel with index i (denoted as may be selected as follows:
$l_i = \arg_l \min Y^*(i, l)$; where $Y^*(i, l)$ denotes the (i,l)-th element of matrix Y.

A selected label associated with a particular pixel may also indicate the connectivity information for that pixel, thereby indicating suitable next pixels for selection and allowing for a set of pixels representing an object to eventually be extracted as image data.

Image Data Provision Device

An embodiment of an image data provision engine may be realized in a specialized image data provision device, an embodiment of which is depicted in FIG. 6. The engine 6030 accepts, as input, image data 6010 containing one or more objects. The engine 6030 may include a graph creator 6040 that constructs a graph of the image, and an image data output unit 6050 that provides image data about the object(s) 6060 to downstream processing units, displays, or data storage media or devices. In an embodiment where the output of the data output unit 6050 goes to a storage medium or device, the information stored may include label information for each pixel.

An alternative embodiment of an image data provision engine, shown in FIG. 7, may include a graph smoothing unit 6070 that performs local smoothing on the created graph before outputting the object image data. Embodiments of the smoothing unit may perform LNP smoothing or may employ other local smoothing algorithms.

Embodiments of the graph creator 6040 may contain multiple sub-units, as depicted in FIG. 8. Embodiments may include a distance definition sub-unit 8010 that performs an embodiment of the effective distance computation process, a node-labeling sub-unit 8070 that performs an embodiment of label application and association, and a connectivity distance matrix generation sub-unit 8050 that generates an embodiment of a connectivity matrix. Alternative embodiments of a graph creator may include different variations of some or all of the above sub-units.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of providing image data, the method comprising:
    identifying information associated with an object in an image;
    constructing a graph based on the identified information associated with the object in the image, wherein the graph includes connectivity similarity for a plurality of nodes in the graph and wherein constructing a graph includes:
  defining effective distances for valid paths between two graph nodes and choosing the minimum value of the effective distances as an inter-nodal distance between the two graph nodes;
  labeling a graph node with a number of labels corresponding to the number of nodes to which the graph node is connected, wherein a label of the node is associated with a connectivity distance between the graph node and a connected node; and
  generating a connectivity distance matrix, wherein the matrix has at least one column vector that corresponds to a graph node's confidence for a specific label;
performing local smoothing between spatially close graph nodes, wherein performing local smoothing between spatially close graph nodes comprises performing an iterative method that includes:
  detecting an overall noise level in the matrix;
  removing an outlier from the at least one column vector, wherein the outlier is determined based on mean confidence values of neighboring nodes; and
  if the overall noise level is above a specified threshold, repeating the detecting and the removing until the noise level is at or below the specified threshold; and
providing image data representing the object based on results of the local smoothing.

2. The method of claim 1, wherein constructing a graph includes establishing seed nodes based on the identified information.

3. The method of claim 1, wherein identifying information includes receiving the information associated with an object in an image.

4. The method of claim 1, wherein performing local smoothing between spatially close graph nodes includes executing an iterative linear neighborhood propagation algorithm.

5. The method of claim 1, wherein at least one graph node has more than two labels.

6. A non-transitory computer-readable medium having embodied thereon a set of instructions that, when executed, causes a computer to perform a method of providing image data, the method comprising:
  identifying information associated with an object in an image;
  constructing a graph based on the identified information associated with the object in the image, wherein the graph includes connectivity similarity for a plurality of nodes in the graph and wherein constructing a graph includes:
    defining effective distances for valid paths between two graph nodes and choosing the minimum value of the effective distances as an inter-nodal distance between the two graph nodes;
    labeling a graph node with a number of labels corresponding to the number of nodes to which the graph node is connected, wherein a label of the node is associated with a connectivity distance between the graph node and a connected node; and
    generating a connectivity distance matrix, wherein the matrix has at least one column vector that corresponds to a graph node's confidence for a specific label;
  performing local smoothing between spatially close graph nodes, wherein performing local smoothing between spatially close graph nodes comprises performing an iterative method that includes:
    detecting an overall noise level in the matrix;
    removing an outlier from the at least one column vector, wherein the outlier is determined based on mean confidence values of neighboring nodes; and
    if the overall noise level is above a specified threshold, repeating the detecting and the removing until the noise level is at or below the specified threshold; and
  providing image data representing the object based on results of the local smoothing.

7. The non-transitory computer-readable medium of claim 6 wherein identifying information includes receiving the information associated with an object in an image.

8. The non-transitory computer-readable medium of claim 6 wherein performing local smoothing between spatially close graph nodes includes executing an iterative linear neighborhood propagation algorithm.

9. The non-transitory computer-readable medium of claim 6, wherein at least one graph node has more than two labels.

10. The non-transitory computer-readable medium of claim 6, wherein constructing a graph includes establishing seed nodes based on the identified information.

* * * * *

UNITED STATES PATENT AND TRADEMARK OFFICE
CERTIFICATE OF CORRECTION

PATENT NO. : 8,842,915 B2  
APPLICATION NO. : 13/260109  
DATED : September 23, 2014  
INVENTOR(S) : Zhou et al.

Page 1 of 1

It is certified that error appears in the above-identified patent and that said Letters Patent is hereby corrected as shown below:

Title Page, Item (52), under "U.S. Cl.", in Column 1, Line 1,
insert -- CPC....................G06T 7/0093 (2013.01); G06T 7/0081 (2013.01); G06T 2207/30004 (2013.01) --.

Title Page, Item (56), under "OTHER PUBLICATIONS", in Column 2, Lines 1-2, delete "et al," and insert -- et al., --, therefor.

In the Specification

In Column 7, Line 42, delete "of b" and insert -- of $\hat{D}$ --, therefor.

In Column 8, Line 60, delete "as may" and insert -- as $i_i$) may --, therefor.

In Column 8, Line 62, delete "matrix Y." and insert -- matrix Y*. --, therefor.

Signed and Sealed this  
Second Day of June, 2015

Michelle K. Lee  
*Director of the United States Patent and Trademark Office*